United States Patent [19]
Rogers et al.

[11] Patent Number: 6,087,035
[45] Date of Patent: Jul. 11, 2000

[54] LOW-VOLTAGE-DROP DIODE BYPASS OF FAILED BATTERY CELL

[75] Inventors: Howard H. Rogers, Torrance; Steven J. Stadnick, Lakewood, both of Calif.

[73] Assignee: Hughes Electronics Corporation, El Segundo, Calif.

[21] Appl. No.: 09/174,838

[22] Filed: Oct. 19, 1998

[51] Int. Cl.[7] .................................................. H01M 2/20
[52] U.S. Cl. ................................... 429/61; 429/7; 429/50
[58] Field of Search ................................ 429/50, 61, 7, 429/1; 320/122

[56] References Cited

U.S. PATENT DOCUMENTS

| | | | |
|---|---|---|---|
| 4,061,955 | 12/1977 | Thomas | 320/6 |
| 4,935,315 | 6/1990 | Herrin | 429/50 |
| 5,002,840 | 3/1991 | Klebenow | 429/150 |
| 5,180,641 | 1/1993 | Burns | 429/1 |
| 5,258,244 | 11/1993 | Hall | 429/61 |
| 5,362,576 | 11/1994 | Clark | 429/7 |
| 5,650,240 | 7/1997 | Rogers | 429/61 |
| 5,675,233 | 10/1997 | Kaneko | 320/15 |
| 5,773,957 | 6/1998 | Imaseki | 320/116 |
| 5,880,575 | 9/1999 | Itou | 320/122 |
| 5,998,967 | 12/1999 | Umeki | 320/122 |

*Primary Examiner*—Maria Nuzzolillo
*Assistant Examiner*—Mark Ruthkosky
*Attorney, Agent, or Firm*—T. Gudmestad; M.W. Sales

[57] ABSTRACT

A battery system includes an electrical storage cell having a positive terminal and a negative terminal. The electrical storage cell is provided with a normally open bypass circuit path that is closed in the event of an open-circuit failure of the electrical storage cell. The bypass circuit path includes a normally open bypass circuit path comprising a diode having a cathode and an anode. The cathode of the diode is electrically connected to the positive terminal of the electrical storage cell and the anode of the diode is electrically connected to the negative terminal of the electrical storage cell. The diode fails to a shorted current path at an imposed current less than a cell failure current, providing a low-resistance, low-voltage-drop bypass of the electrical storage cell.

11 Claims, 2 Drawing Sheets

LOW-VOLTAGE-DROP DIODE BYPASS OF FAILED BATTERY CELL

BACKGROUND OF THE INVENTION

This invention relates to electrical storage batteries, and, more particularly, to a shorting bypass of an electrical storage cell operable when the cell fails in the open-circuit condition.

Rechargeable cells or batteries are electrochemical energy storage devices for storing and retaining an electrical charge and later delivering that charge as useful power. Familiar examples of the rechargeable electrical storage cell are the lead-acid cell used in automobiles and the nickel—cadmium cell used in various portable electronic devices. Another type of electrical storage cell having a greater storage capacity for its weight and greater lifetime is the nickel oxide/pressurized hydrogen electrical storage cell, an important type of which is commonly called the nickel—hydrogen electrical storage cell and is used in spacecraft applications. The weight of the spacecraft electrical storage cell must be minimized while achieving the required performance level, due to the cost of lifting weight to earth orbit and beyond.

The nickel—hydrogen electrical storage cell includes a series of active plate sets which store an electrical charge electrochemically and later deliver that charge as a useful current. The active plate sets are packaged within a hermetic pressure vessel that contains the plate sets and the hydrogen gas that is an essential active component of the electrical storage cell. A single nickel—hydrogen electrical storage cell delivers current at about 1.3 volts, and a number of the electrical storage cells are usually electrically interconnected in series to produce current at the voltage required by the systems of the spacecraft.

Although the electrical storage cells are designed for excellent reliability, there is always the chance of a failure. One failure mode of the electrical storage cell is an open-circuit failure, in which there is no longer a conducting path through the electrical storage cell. In the event of an open-circuit failure of a single electrical storage cell in a series-connected array of cells, all of the storage capacity of the array is lost.

A bypass around a potentially failed cell is required to prevent loss of the storage capacity of the entire array. The bypass must not conduct when the electrical storage cell is functioning properly, but it must activate to provide an electrically conductive bypass when the electrical storage cell fails in the open-circuit mode. The use of bypass rectifier diodes and relays with high current capacity to provide this bypass function is known, but these bypass devices add a considerable amount of weight to each of the electrical storage cells, and a separate bypass is required for each of the 24 or more storage cells in a typical battery system. Additionally, the bypass diode has a relatively high internal resistance that dissipates power when it functions as a bypass, and the relay itself has the potential for failure.

There is a need for an improved technique for achieving electrical bypass of electrical storage cells which fail in an open-circuit mode. The present invention fulfills that need, and further provides related advantages.

SUMMARY OF THE INVENTION

The present invention provides an electrical bypass for a failed-open electrical storage cell. The bypass is extremely light in weight. It passes substantially no current when the electrical storage cell operates normally, but is activated as the electrical storage cell fails to the open-circuit state. When activated, the bypass has a low voltage drop, so that it dissipates little power as the remainder of the battery is charged and discharged. High dissipated power tends to overload the heat-dissipation structure of the spacecraft and is a drain on the power supply of the system.

In accordance with the invention, a battery system comprises a first electrical storage cell having a positive terminal and a negative terminal. The first electrical storage cell has an open-circuit failure mode. There is at least one additional electrical storage cell in electrical series connection with the first electrical storage cell. The at least one additional electrical storage cell imposes a cell failure current on the first electrical storage cell during the open-circuit failure mode of the first electrical storage cell. A normally open bypass circuit path comprises a diode having a cathode and an anode, with the cathode of the diode being electrically connected to the positive terminal of the electrical storage cell and the anode of the diode being electrically connected to the negative terminal of the electrical storage cell. The diode fails to a shorted current path at a maximum diode current less than the cell failure current.

The bypass approach of the invention is based upon utilizing a diode in the bypass circuit that blocks current flows in the bypass during normal operation of the battery system but intentionally fails when the current flowing through the bypass causes the diode junction temperature to exceed its rated maximum temperature. Under these conditions, the diode fails to a short circuit path or shunt, which has very low electrical resistance and acts to conduct the battery system current around the failed electrical storage cell with little power dissipation.

In the past, conventional diode bypasses have used rectifier diodes of large current capacity, so that they did not fail when serving as the bypass current flow path. Such diodes were necessarily large and heavy, particularly considering the fact that they are backup devices for reliable battery systems and will likely never be called upon for service. When in service following open-circuit failure of an electrical storage cell, the conventional diode performed its bypass function, but had a relatively large power dissipation due to the forward voltage drop of the rectifier diode.

The present invention recognizes the advantages achieved by sizing the bypass diode so that it intentionally "fails" to a shorted condition. The diode used in the present approach is smaller than the conventional diode. The failed diode provides a path of lower electrical resistance than the conventional rectifier diode, reducing power dissipation by the bypass.

The present invention is particularly useful in conjunction with arrays of multiple electrical storage cells in series arrangement and used in spacecraft applications. The present approach provides a lightweight, compact bypass for each such cell of the array. The array of cells, with bypasses, is launched into orbit around the earth, into another orbit, or sent on some other type of space mission. If a cell of the battery array fails, the present invention permits the remaining electrical storage cells of the array to continuing functioning, albeit at a lower, but still useful, voltage output.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
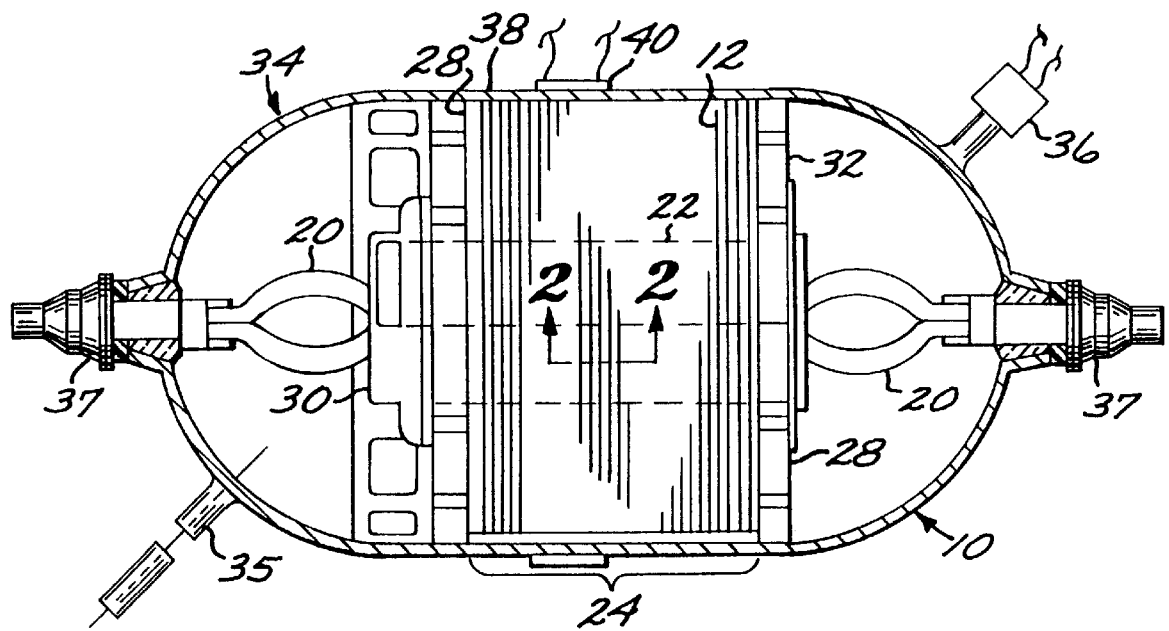
FIG. 1 is a sectional elevational view of a flight-type nickel—hydrogen energy storage cell.
Figure 2:
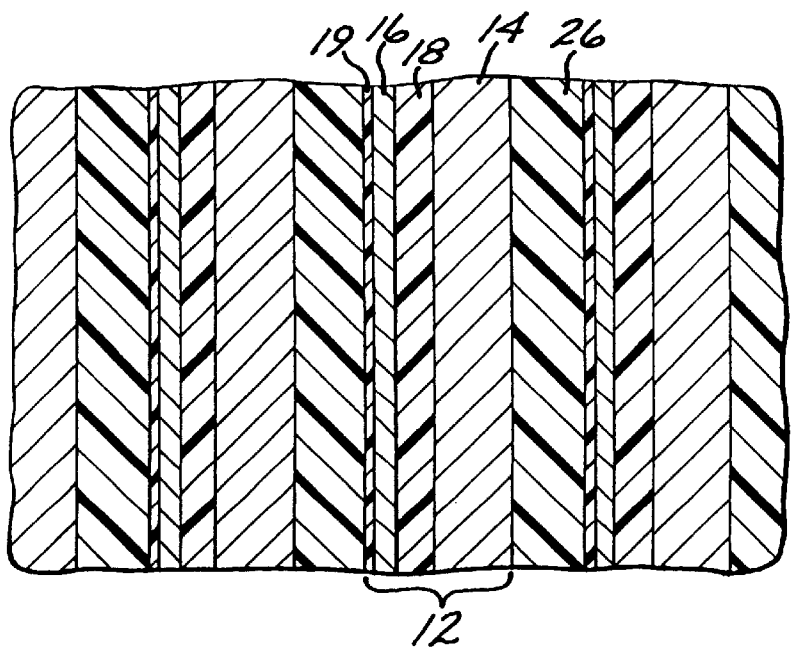
FIG. 2 is a detail of FIG. 1, taken generally on line 2—2 and illustrating the plate sets.

The present invention is preferably used in conjunction with a number of electrically interconnected nickel—hydrogen electrical storage cells 10, one of which is illustrated in FIGS. 1–2, of the pressurized gas-metal cell type. (The invention is operable with other types of battery systems, such as nickel—cadmium cells 10, as well.) Such an electrical storage cell 10 typically comprises a plurality of individual plate sets 12. Each plate set in turn comprises an anode or positive electrode 14, a cathode or negative electrode 16, and an electrolyte-containing separator 18, which physically separates the electrodes 14 and 16 and also supplies the electrolyte medium through which ionic and electron charge transfer occurs. Charging and discharging of the electrodes 14 and 16 are accomplished through respective electrical leads 20.

Various constructions of nickel—hydrogen cells and components are known in the art and are disclosed in the following U.S. Pat. Nos. 4,683,178; 4,369,212; 4,283,844; 4,262,061; 4,250,235; 4,000,350; and 3,669,744.

The positive electrode 14 is formed by impregnating nickel hydroxide into porous sintered nickel that is supported on an etched nickel electrode substrate. The negative electrode 16 is coated on one side by a sintered mixture of platinum black and polytetrafluoroethylene and on the other side with a porous layer 19 of polytetrafluoroethylene. These layers are applied to a nickel substrate in the form of etched sheet or a woven mesh, to form the negative electrode 16. Many different types of separators 18 are known, including, for example, asbestos, nylon, and a cloth of zirconium oxide-yttrium oxide. The electrolyte, preferably a 26 or 31 percent by weight concentration of aqueous potassium hydroxide, is impregnated into the separator 18.

The individual plate sets 12 are assembled onto a central core 22 to form a stacked array 24. A monofilament polypropylene screen 26 is placed between each plate set 12 during assembly, so that oxygen liberated during overcharging at each positive electrode 14 can diffuse away from the electrode 14 and to the negative electrode 16 to combine with hydrogen. The stacked array 24 is placed under a longitudinal pressure of, for example, about 10 pounds per square inch, by tightening compression plates 28 against each end of the stacked array 24. The tightening of the compression plates 28 is preferably accomplished by compressing the array 24 and then tightening a nut 30 on threads on the core 22, thereby compressing a Belleville washer set 32 against the compression plate 28 to hold the stacked array 24 in place.

The stacked array 24 is contained within a hermetically sealed pressure vessel 34 having a wall 38 manufactured of a material such as Inconel 718 nickel-base alloy which can withstand internal pressures on the order of 1,000 psia, without damage by hydrogen embrittlement. The material of the wall 38 has a relatively low diffusion coefficient of hydrogen therethrough, so that hydrogen is contained within the interior of the pressure vessel 34. A gas fill tube 35 allows gas content and pressure within the pressure vessel 34 to be established initially, but the tube 35 is sealed after the initial charging procedures. The pressure vessel 34 is typically constructed in the form of a cylindrical tube having domed ends. By way of illustration, the nickel—hydrogen electrical storage cell 10 having the pressure vessel 34 of external dimensions of 3½ to 5½ inches in diameter by 13–15 inches long contains about 40–100 individual plate sets 12, with a resulting electrical storage capacity of the cell of about 50 to about 350 ampere-hours. The electrical storage cell 10 may be charged and discharged through thousands of cycles without apparent damage, if the charging and discharging are accomplished properly.

The electrical leads 20 pass from the interior of the pressure vessel 34 to its exterior through electrical feedthroughs 37. The pressure within the pressure vessel 34 may optionally be monitored by any operable technique. One such pressure-monitoring device is a pressure gauge 36 communicating with the interior of the pressure vessel, which measures interior pressure directly. Another pressure-monitoring device is a strain gage 40 mounted to the exterior of the wall 38 of the pressure vessel 34. The deformation of the wall 38, as measured by the strain gage 40, is a function of the internal pressure within the pressure vessel 34, which functional dependence is determined in initial calibration testing. The strain gage 40 approach to pressure measurement is preferred, inasmuch as the strain gage is lighter than the pressure gauge.

When discharging, each of the electrical storage cells 10 delivers output power at about 1.3 volts, which is too low for many spacecraft requirements. To obtain higher voltages, a number of individual electrical storage cells 10 are ordinarily combined in electrical series arrangement as a battery.

Figure 3:
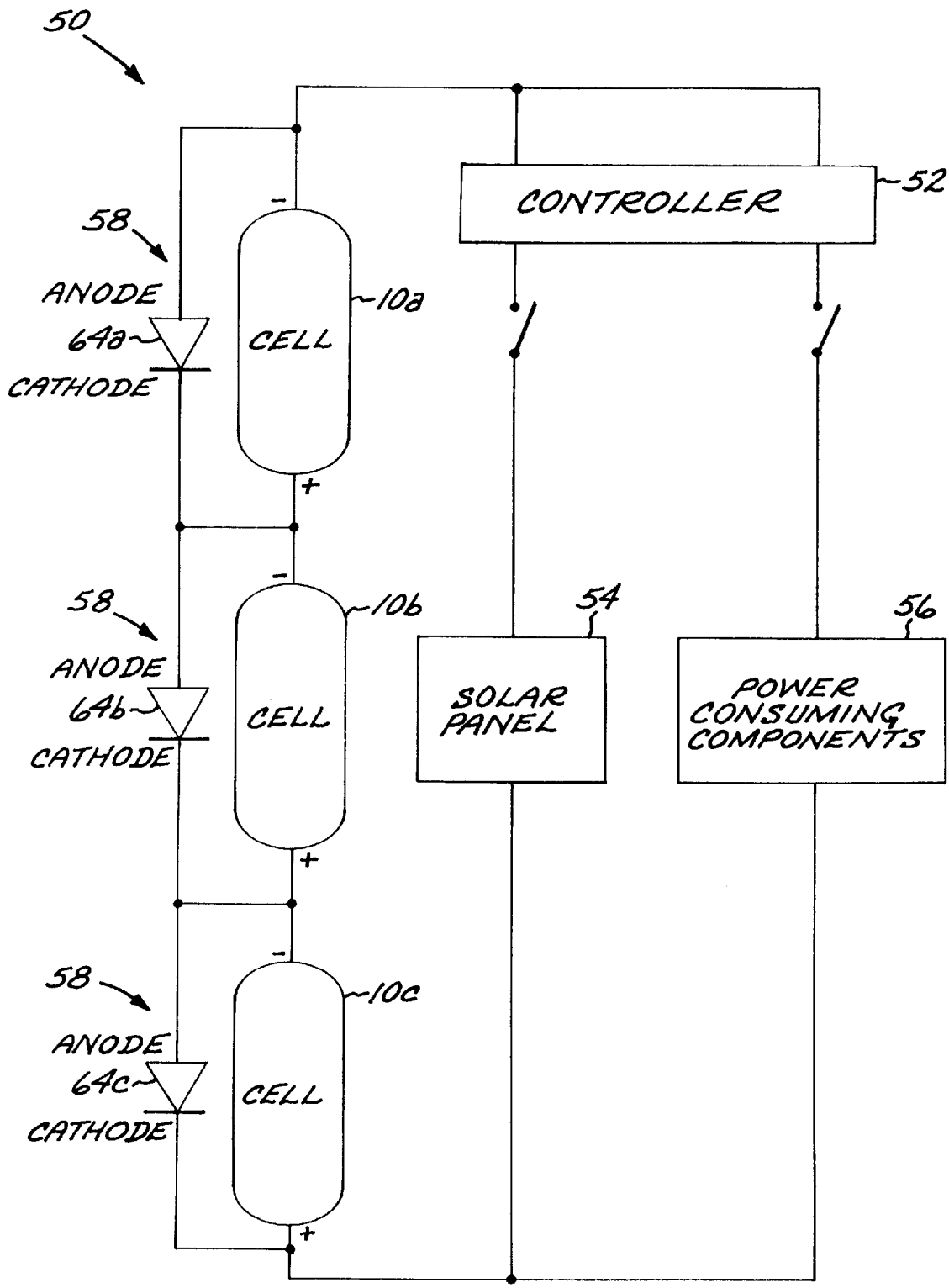
FIG. 3 is a schematic representation of a battery system having bypass circuit paths according to the invention.

FIG. 3 illustrates a battery system 50 having three electrical storage cells 10a, 10b, and 10c in an electrical series arrangement, although in practice the number of electrical storage cells in series is usually greater. Operating through a controller 52, the electrical storage cells 10 are periodically charged by a solar panel power supply 54 and discharged to provide power to power consuming components 56.

The electrical storage cells 10 are designed for use over a period of many years, with excellent reliability. However, failures may occur so that the electrical path through the electrical storage cell fails to an open circuit. For example, if the hydrogen gas leaks out of the pressure vessel 34 due to the failure of a seal or due to a pinhole in the wall caused by a micrometeorite impact, the electrical storage cell 10 fails to an open-circuit state so that electrical current does not flow through the electrical storage cell. The consequences of such a failure are compounded if the failed electrical storage cell is in series with other electrical storage cells, as shown in FIG. 3, because these other electrical storage cells are rendered useless by the open-circuit failure of the one electrical storage cell.

To remove a failed storage cell 10 from the series arrangement, a bypass 58 is provided for each storage cell 10. When any one of the cells 10 functions normally, its bypass 58 is inactive and carries no current. Upon failure of the cell 10 to an open-circuit condition, the bypass 58 becomes active and carries current around the failed cell. The remaining properly functioning cells continue to store and deliver power, but at a diminished voltage.

In a preferred embodiment shown in FIG. 3, a diode 64 is connected across the cell 10 such that the cathode of the diode 64 is connected to the positive terminal of the cell 10, and the anode of the diode 64 is connected to the negative terminal of the cell 10. The diode 64 has a characteristic "maximum diode temperature rating", a temperature below which the diode functions normally to conduct current, and above which the diode fails to an internally shorted state. The maximum diode temperature rating is a property of the diode, is specified for the diode by the manufacturer, and indicates its size in respect to its maximum current-carrying capability prior to failure to an internally shorted state. If the voltage across the diode 64 is in the reverse polarity with respect to the diode, as in normal operation of the cell 10, no current flows through the diode 64. If the cell 10a, for example, fails to an open-cell condition, the voltage across the diode 64, imposed by the remaining cells 10b and 10c, reverses and rises to the point that it conducts, and current flows through the diode 64. The diode 64 is sized so that the voltage applied across the diode as a result of the failure of its cell 10a, typically greater than about 0.6 volts, and the resulting cell failure current flowing through the diode, typically about 50–300 amperes in the case of a series arrangement of nickel—hydrogen cells 10, causes the diode to heat to a temperature above the maximum diode temperature rating and causes the diode to fail to an internally shorted state.

Thus, in designing the bypass 58 of the invention as shown in FIG. 3, the amount of current which would flow if any one of the cells 10 is internally shorted is first determined. The diode 64 for that cell 10 is selected to have a maximum diode current less than the amount of current which would flow if that cell were internally shorted and current were supplied by the remaining non-internally-shorted cells. In most cases, the cells 10 are of the same current-delivery capacity, so all of the diodes 64 would be of the same maximum diode current, but the present approach would also be operable where the cells 10 are not of the same current-delivery capacity.

Diodes have been used in bypass circuits previously in an electrical arrangement similar to that of FIG. 3, but care has been taken to size each diode such that it would not fail under the high bypass current encountered when the cell associated with a particular diode fails to an open-circuit condition. That is, in the prior approaches the diode is selected so that the amount of current which would flow if any one of the cells 10 is internally shorted is less than the maximum diode current of the bypass for that internally shorted cell. The present inventors have recognized that it would be better from a system standpoint for the bypass diode to function normally (i.e., not electrically conduct) during normal operation of the battery system 50, but then to fail to an internally shorted state when the electrical storage cell fails. The reason is that, in its internally shorted (failed) state, the internal electrical resistance of the failed diode is much lower than the internal electrical resistance of the functional diode. The large amperage flowing through the internally shorted diode 64 after the open-circuit failure of its cell 10 therefore produces less ohmic heating than would a similar-but-unshorted diode, carrying the same current. The reduction of energy dissipation in the present approach, as compared with the approach of using a conventional diode that does not fail to an internally shorted state, is important both because the energy dissipation requires larger heat removal and radiator capacity on the spacecraft and because the energy dissipation reduces the efficiency of the energy storage system.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A battery system, comprising:
   a first electrical storage cell having a positive terminal and a negative terminal, the first electrical storage cell having an open-circuit failure mode;
   a normally open bypass circuit path comprising a diode having a cathode and an anode, the cathode of the diode being electrically connected to the positive terminal of the electrical storage cell and the anode of the diode being electrically connected to the negative terminal of the electrical storage cell, the diode failing to a shorted current path when heated to a temperature above a maximum diode temperature rating; and
   at least one additional electrical storage cell in electrical series connection with the first electrical storage cell, the at least one additional electrical storage cell imposing a cell failure current on the diode such that the diode is heated to a temperature greater than the maximum diode temperature rating during the open-circuit failure mode of the first electrical storage cell.

2. The battery system of claim 1, wherein the first electrical storage cell and each of the at least one additional electrical storage cell are each selected from the group consisting of a nickel—hydrogen cell and a nickel—cadmium cell.

3. The battery system of claim 1, wherein the cell failure current is greater than about 50 amperes.

4. The battery system of claim 1, wherein the cell failure current is from about 50 amperes to about 300 amperes.

5. A battery system, comprising:
   at least two electrical storage cells in electrical series relationship, the at least two electrical storage cells including
      a first electrical storage cell having a positive terminal and a negative terminal, and
      a remainder of the electrical storage cells, the remainder of the electrical storage cells having a cell failure current in the event of an open-circuit failure of the first electrical storage cell;
   a bypass circuit path comprising a diode having a cathode and an anode, the cathode of the diode being electrically connected to the positive terminal of the first electrical storage cell and the anode of the diode being electrically connected to the negative terminal of the first electrical storage cell, the diode failing to a shorted current path at an imposed current of less than the cell failure current.

6. The battery system of claim 5, wherein the first electrical storage cell and each of the remainder of the electrical storage cells are each are each selected from the group consisting of a nickel—hydrogen cell and a nickel—cadmium cell.

7. The battery system of claim 5, wherein the cell failure current is greater than about 50 amperes.

8. The battery system of claim 5, wherein the cell failure current is from about 50 amperes to about 300 amperes.

9. A method for operating a battery system, comprising the steps of providing a battery system comprising
   a first electrical storage cell having a positive terminal and a negative terminal,
   at least one additional electrical storage cell in electrical series connection with the first electrical storage cell, and
   a normally open bypass circuit path comprising a diode having a cathode and an anode, the cathode of the diode being electrically connected to the positive terminal of the first electrical storage cell and the anode of the diode being electrically connected to the negative terminal of the first electrical storage cell, the diode failing to a shorted current path upon the imposition of a current greater than a maximum diode current; thereafter the first electrical storage cell failing in an open-circuit failure mode; and thereafter the at least one additional electrical storage cell imposing a cell failure current on the diode greater than the maximum diode current, whereupon the diode fails to a shorted current path between the positive and negative terminals of the first electrical storage cell.

10. The method of claim 9, wherein the first electrical storage cell and the at least one additional electrical storage cell are each nickel—hydrogen cells.

11. The method of claim 9, including an additional step, after the step of providing but before the step of the first electrical storage cell failing in an open-circuit failure mode, of launching the battery system into space.

* * * * *